United States Patent Office 2,886,322
Patented May 12, 1959

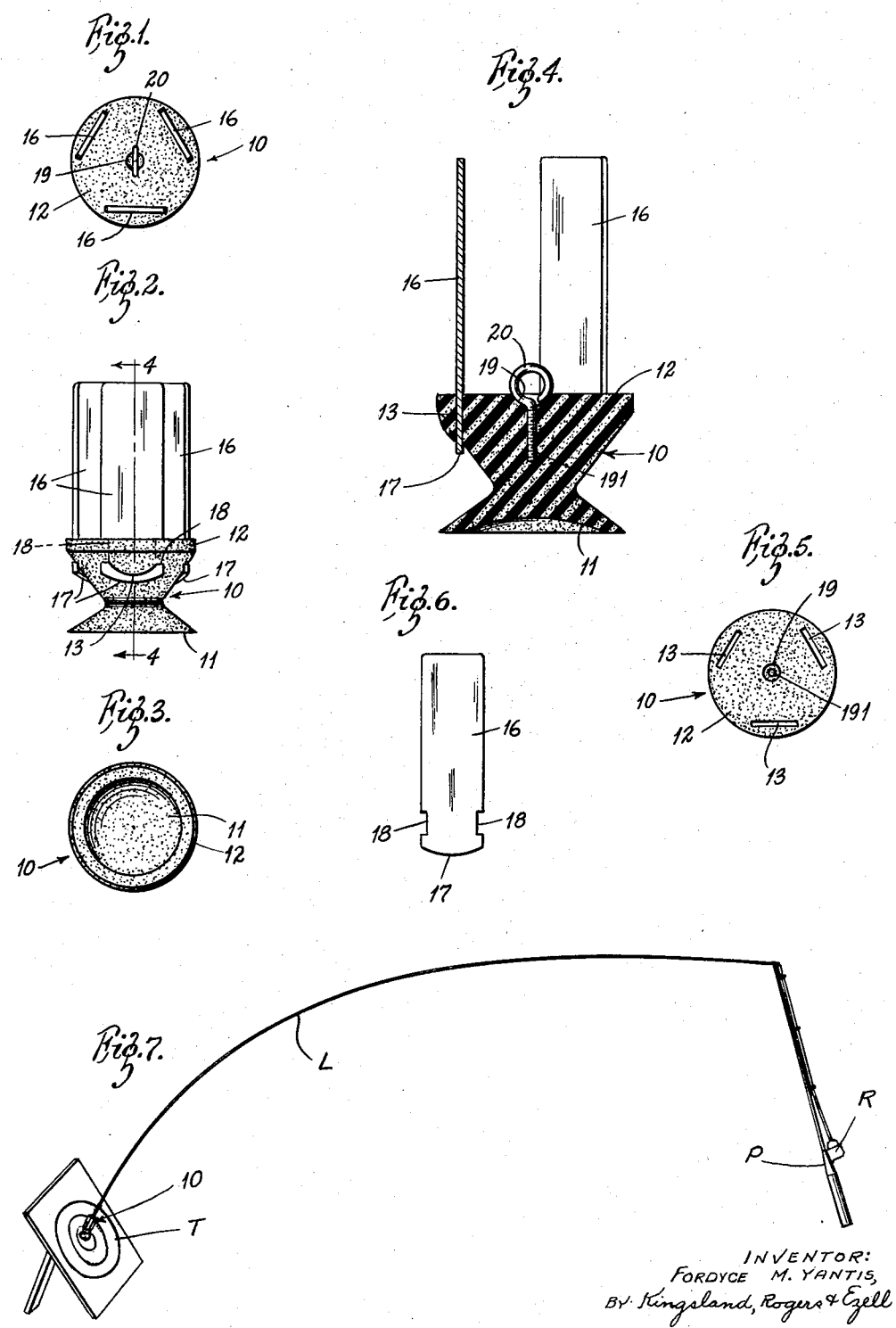

2,886,322
CASTING PLUG
Fordyce M. Yantis, Geneva, Ill.
Application June 24, 1957, Serial No. 667,563
5 Claims. (Cl. 273—106.5)

This invention relates to a casting plug. More particularly, the invention includes a plug that can be used on the end of a fish line for practicing casting, or for a game, as desired.

The plug is particularly designed to be molded from unbreakable plastic material, preferably a moldable rubberlike compound, so as to have a head with a suction cup on its front end, and elongated wings or stabilizers also of resilient, elastic material, projecting backwardly from it, clustered around an eyelet whereon the swivel or other attaching means from an ordinary fish line may be attached.

In particular, the plug includes a head member initially made separately from the stabilizers, and slotted so that the stabilizing wing members may be easily inserted into the slots so as to stay there during use. The plug and the wings or stabilizers are all preferably more or less flexible so as to be yieldable to forces that otherwise might break the device; and yet the components are of resilient material, so that the device always resumes its initial shape after deformation. The wings may or may not be more stiff than the plug. The plug can be stored away casually, but will always be available for use and in shape so as to be reasonably accurate in casting as is the ordinary fish lure.

The objects of the invention are those aforesaid, together with such others as will appear hereafter.

Figure 1 is a top or rear view of the assembled plug;
Figure 2 is a side elevation;
Figure 3 is a bottom or front view;
Figure 4 is a mid-section taken on the line 4—4 of Figure 3;
Figure 5 is a top or rear view of the head prior to insertion of the stabilizers or wings;
Figure 6 is an elevation of one of the wings separately; and
Figure 7 is a diagrammatic view showing the use of the device in connection with its target.

The plug consists of a head 10 that preferably is more or less in the form of two frusto-conical sections that are joined at their smaller sections to provide a forward end in the shape of a suction cap 11, and a rear or stabilizer-receiving end 12. The end 12 has a plurality of slots 13. Three such slots are here illustrated. See particularly Figure 5. The slots are symmetrically arranged around the axis of the head 12, and are designed to receive the forward ends of wings or stabilizers 16, one of which is shown separately in Figure 6.

Each wing or stabilizer 16 has a forward edge 17 that is preferably curved as shown so that it may be more readily inserted into the slots 13. Back of its forward end 17 the stabilizer is oppositely notched at 18. With this arrangement, when a wing 16 is forced through a slot 13, the material of the head 12, which is elastic, extends to permit the wide, leading end 17 of the wing 16 to pass through the slot and lock in place to prevent accidental withdrawal of the wing 16.

At the center of the head 17, there is a circular recess 19, in the center of which there is a small hole 191 into which is screwed an eyelet 20. The hole 191 is small enough to assure a tight, secure fit of the eyelet and stability is increased by the recess 19, into which the circular part of the eyelet fits. The recess 19 should be centrally about one half the diameter of the eyelet.

To assemble the plug, the user need merely insert all three of the wings 16 into the several slots 13. Then he attaches the plug to the usual swivel on the end of the line L, that is diagrammatically illustrated in Figure 7 as being on a reel R, attached to a fishing pole P.

The illustration in Figure 3 is approximately the full preferred size, although size is not critical. The preferred size provides a head diameter of about one and one-eighth to one and one-quarter inches, and provides wings projecting about one and one-half inches from the rear surface of the head.

It is self-evident that the head, being made of rubber or similar synthetic material, is fairly heavy and contains the greatest mass of the assembly.

In use, a target T, preferably having a smooth surface with appropriate markings such as the rings illustrated, will be located a considerable distance away from the place from which the user wishes to cast, and desirably at about 65° to the ground. The user applies the plug to his line by connecting the eyelet 20 to the usual swivel. He may wet the suction cup 11, although it will normally adhere without wetting with less resistance to removal. This latter is desirable for one practicing alone. The holding power of the cup may decay with use, but always may be restored by being wet by water, or application of mineral oil to the target. Casting in the usual manner, he will attempt to hit the bull's eye on the target T.

It is evident that a user may keep himself in practice for casting during times when he cannot actually go fishing. Also, the device makes a game that can be played by two or more persons who alternately cast toward the same target or, who may cast toward individual targets as is desired. In this case, the rings on the target T will have appropriate values, depending on their distance from the center.

What is claimed is:

1. A casting device comprising a plug attached to a fish line for use with a fishing pole and a reel, and a target of smooth material, the plug comprising a head and equispaced elongated strips removably mounted in said head and extending rearwardly thereof for causing the head to travel with its forward end in the lead, and a suction cup-like device on the forward end of the head, and means for attaching the rear end of the head to a fishing line.

2. A plug for use with a fishing line or the like comprising a head having a forward face with a suction cup thereon, the head being made of resilient material, a plurality of resilient wing elements projecting backwardly from the head a predetermined distance so as to stabilize flight of the head and to cause it to travel with the suction cup in the leading position, and means on the back end of the head for use in attaching it to the fish line.

3. The combination of claim 2, wherein the wings comprise elements that are initially separate from the head, they having flat forward ends, the head having slots extending into it to receive the flat forward ends of the wings, and inter-engaging means to keep the wings from inadvertently coming out of the head.

4. The combination of claim 2 wherein the wings comprise elongated flat, straight, strips arranged in a circle around the axis of the head, parallel to the axis and tangentially to the circle.

5. A practice casting plug comprising an integral forwardly disposed suction cup and a rearwardly disposed head portion formed as a frusto-conical section, said head portion having spaced slots therethrough, an elongated strip mounted in each slot and extending rearwardly therefrom to stabilize flight of said plug, each strip extending forwardly through its respective slot, and being locked against the side wall of said head portion to prevent accidental removal, and an eyelet mounted in said head portion at the rear thereof for engagement by a fishing line.

References Cited in the file of this patent

UNITED STATES PATENTS

| | | |
|---|---|---|
| 1,989,484 | Maryfield | Jan. 29, 1935 |
| 2,280,441 | Mull | Apr. 21, 1942 |
| 2,338,274 | Yancey | Jan. 4, 1944 |
| 2,807,469 | Swartz | Sept. 24, 1957 |

FOREIGN PATENTS

| | | |
|---|---|---|
| 1,348 | Great Britain | 1908 |